United States Patent [19]

Koziczkowski et al.

[11] Patent Number: 5,411,162
[45] Date of Patent: May 2, 1995

[54] V-BAND COUPLING FOR AN EXPLOSION-PROOF ENCLOSURE

[75] Inventors: Joseph E. Koziczkowski, Milwaukee County; Jeffrey R. Annis; Roland L. Krieger, both of Waukesha County; Jerome P. Stache, Milwaukee County, all of Wis.

[73] Assignee: Allen-Bradley Company, Inc., Milwaukee, Wis.

[21] Appl. No.: 923,039

[22] Filed: Jul. 31, 1992

[51] Int. Cl.$^6$ .............................. B65D 45/37
[52] U.S. Cl. ................... 220/320; 220/4.07; 220/4.21; 220/321; 220/454; 220/455; 220/584; 220/686; 24/20 R; 24/279; 292/256.65; 292/258; 428/680; 428/681; 428/687; 428/937
[58] Field of Search ............ 220/4.07, 4.16, 4.21, 220/4.24, 4.25, 320, 321, 454, 455, 584, 686; 215/275; 24/20 R, 274, 279, 282; 292/256.6, 256.65, 258; 428/680, 681, 687, 937

[56] References Cited

U.S. PATENT DOCUMENTS

| | | | |
|---|---|---|---|
| 1,826,947 | 10/1931 | Nelson | 220/321 |
| 2,936,503 | 5/1960 | Rindfleisch | 24/279 |
| 3,029,724 | 4/1962 | Lee | 220/320 X |
| 3,283,348 | 11/1966 | Farmer et al. | 220/686 X |
| 3,400,100 | 9/1968 | Keating | 428/937 X |
| 3,475,597 | 10/1969 | Desloge | 24/279 X |
| 3,762,884 | 10/1973 | Grisaffe et al. | 428/937 X |
| 3,861,180 | 1/1975 | Heckrotte, Sr. et al. | 215/275 X |
| 4,092,519 | 5/1978 | Eaton-Williams | 220/686 X |
| 4,189,317 | 2/1980 | Patel | 428/937 X |
| 4,219,125 | 8/1980 | Wiltshire et al. | 220/686 X |
| 4,267,940 | 5/1981 | Wade | 220/686 X |
| 4,604,169 | 8/1986 | Shiga et al. | 428/680 X |
| 4,828,139 | 5/1989 | Capitani | 220/320 X |
| 4,999,259 | 3/1991 | Hashimoto et al. | 428/667 X |
| 5,074,428 | 12/1991 | Wildfeuer | 220/322 |

Primary Examiner—Allan N. Shoap
Assistant Examiner—Stephen Cronin
Attorney, Agent, or Firm—Mark Pfieffer; John J. Horn; H. F. Hamann

[57] ABSTRACT

A V-band coupling for use on an explosion-proof enclosure. The V-band coupling includes a V-band having a toughened layer along its interior surfaces for gripping the flanges on the enclosure which the V-band engages when it is installed on the enclosure. The roughened layer results in an increased coefficient of friction between the V-band and flanges which is effective for reducing the load experienced by the trunnion joints of the coupling during explosion events thereby allowing the explosion-proof enclosure to withstand high internal pressures without system failure.

5 Claims, 3 Drawing Sheets

V-BAND COUPLING FOR AN EXPLOSION-PROOF ENCLOSURE

BACKGROUND OF THE INVENTION

The present invention relates to explosion-proof apparatuses and more particularly to V-band couplings for use in holding together explosion-proof enclosures or other pressure vessels which have circular flange joints.

Explosion-proof enclosures are intended for use in hazardous environments where flammable gases or vapors may be present. These enclosures are designed to contain internal explosions without causing any external hazard. The enclosures must therefore be sufficiently strong to avoid fracture or rupture and must have sufficiently tight shaft and flange tolerances to insure that any hot gases resulting from an explosion will be cooled as they attempt to exit the enclosure.

Explosion-proof enclosures have frequently been designed using the brute strength approach whereby a cover is attached to a base through the use of multiple bolts which are time consuming to remove when accessing the interior of the enclosure. As an alternative V-band couplings have been employed to secure separate halves or sections of explosion-proof enclosures together which allow for much more convenient access into the interiors of the enclosures and smaller enclosure dimensions due to reduced flange size. However, it has heretofore been difficult to provide an explosion-proof enclosure secured by a V-band coupling having the same ability to withstand the high pressures of internal explosions since V-band couplings have had a tendency to slide off of the flanges of the enclosures which they hold together as their trunnion joints fail due to high levels of tensile or hoop stress. V-band couplings can be made to be very robust in order resist the stresses involved but his requires awkward and bulky components which are also costly to produce.

It is therefore an object of the present invention to provide an improved V-band coupling for holding together the halves or sections of an explosion-proof enclosure which enables the enclosure assembly to have greater ability to withstand internal explosions.

It is a further object of the present invention to provide a V-band for an explosion-proof enclosure featuring a higher coefficient of friction with the enclosure flanges which it engages in order to reduce the amount of hoop stress and trunnion load resulting from internal explosions in such enclosures.

It is yet another object of the present invention to provide an improved V-band coupling for use on an explosion-proof enclosure which is cost effective to manufacture and is reliable in operation.

SUMMARY OF THE INVENTION

The present invention constitutes an improved V-band coupling for use in securing together the halves or sections of an explosion-proof enclosure. The V-band coupling includes a retaining strap which encircles one or more segments making up a circular V-band. The ends of the retaining strap are connected by one or more trunnion joints which allow the coupling to be fitted into place over matching flanges on the halves or sections of the enclosure and tightened down to secure the halves or sections of the enclosure together. The V-band includes a toughened layer on its surfaces for gripping the flanges which is operative for increasing the coefficient of friction between the V-band and the flanges of the enclosure. The increased coefficient of friction between the V-band and the flanges of the enclosure helps to prevent the V-band coupling from sliding off the flanges and therefore results in dramatically decreased stress on the trunnion joints connecting the sections of the coupling together. In the preferred embodiment the roughened layer is formed by grit-blasting the interior surfaces of the V-band and then applying a corrosion resistant coating to these surfaces by thermal spraying.

DESCRIPTION OF THE PREFERRED EMBODIMENT

Figure 1:
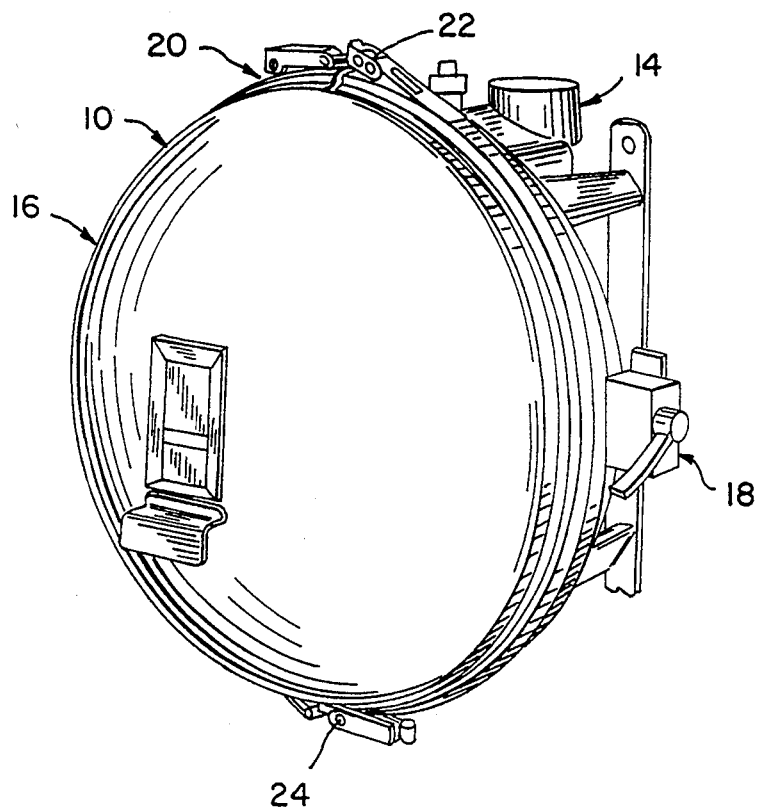
FIG. 1 provides a perspective view of an explosion-proof enclosure secured by a V-band coupling.

Referring now to FIG. 1, an explosion-proof enclosure 10 is shown which comprises a base 14 and a cover 16 which are secured together by a V-band coupling 20 having two trunnion joints 22 and 24. The enclosure 10 is designed to contain an internal explosion without fracturing or rupturing and prevent the explosion from igniting any combustible gases which may be present outside of the enclosure.

Figure 2:
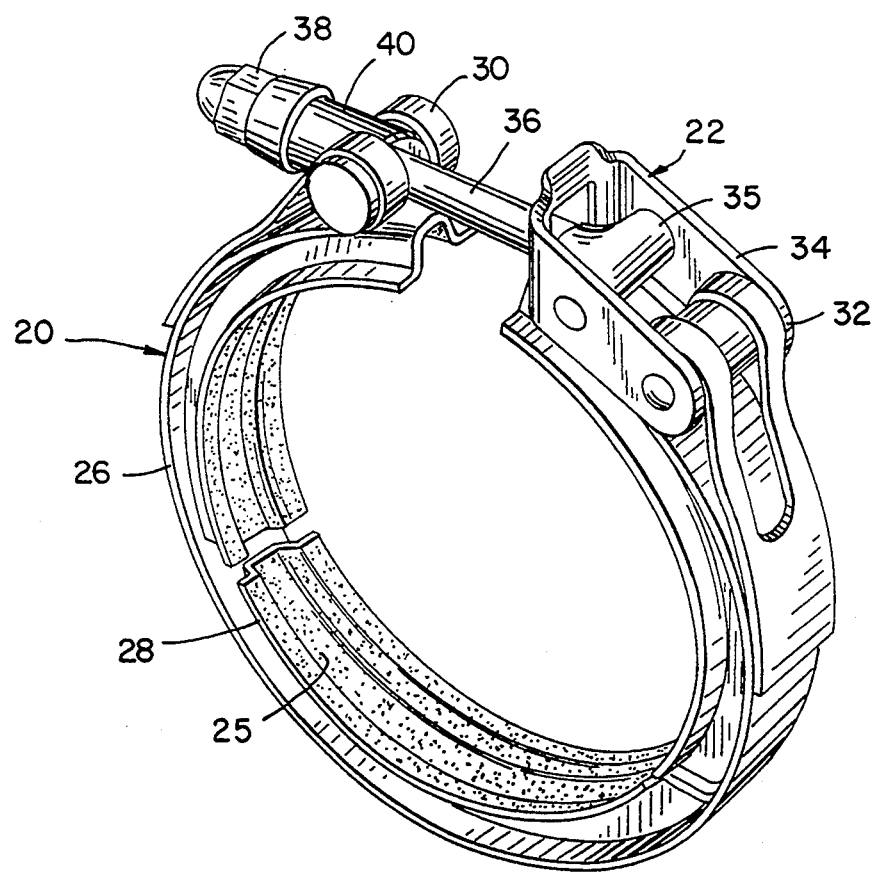
FIG. 2 provides a perspective view of one style of V-band coupling illustrating the construction of a typical V-band coupling.

Referring now to FIG. 2, a V-band coupling 20 having a unitary construction and featuring a single trunnion joint 22 is shown. The coupling 20 includes a single metal strap 26 extending around the outside of a V-band 28. The V-band 28 is made up of three segments and includes a roughened layer 25 along its interior surfaces. The ends of the strap 26 are connected to the trunnion joint 22 by being folded over the pin assemblies 30 and 32 and being welded back unto themselves. The latch 34 removably holds the head 35 of a T-bolt 36 which extends between the opposite ends of the strap 26. A nut 38 threads onto the end of the T-bolt 36 as it passes through a retainer 40 attached to the pin assembly 30. In operation, the head 35 of the T-bolt 36 engages the latch 34 attached to the pin assembly 32 while the nut 38 engages the retainer 40 attached to the pin assembly 30 and the T-bolt 36 thereby connects the ends of the strap 26 together in an arrangement which may be tightened by turning the nut 38. When the coupling 22 is secured to an enclosure such as the enclosure 10 the V-band 28 acts to engage special outwardly projecting flanges along the edges of the base 14 and cover 16 thereby securely attaching the base 14 to the cover 16.

Figure 3A:
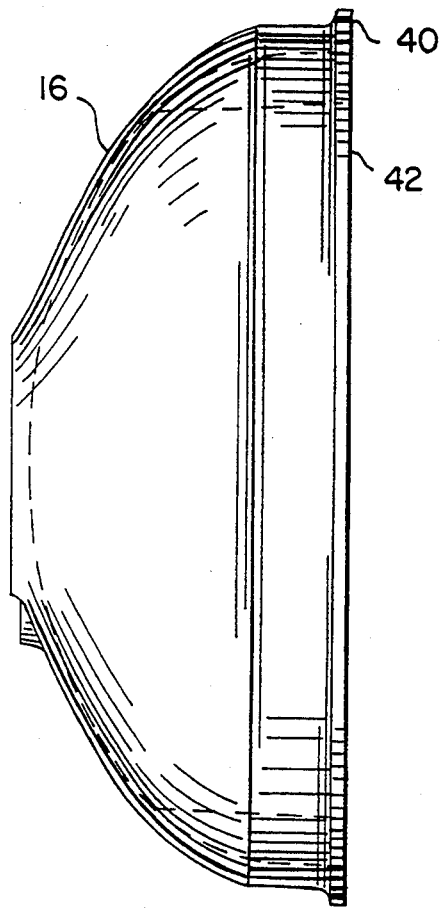
FIGS. 3A and 3B provide a side view of a cover of a explosion-proof enclosure as shown in FIG. 1 and a cross-sectional view of an angled V-band flange for such a cover.
Figure 3B:
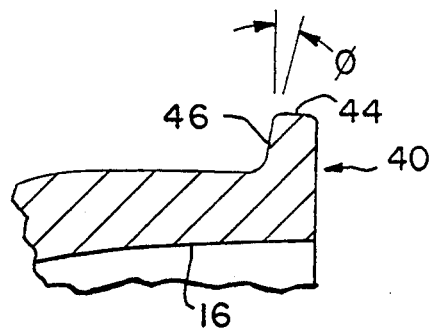

Referring now to FIGS. 3A and 3B, the cover 16 is shown as including a circular ridge-like flange 40 which projects radially outward along its inner edge 42. The cover 16 follows generally circular or elliptical contours and is manufactured from cast aluminum alloy having the flange 40 machined along its inner edge 42 for mating with the base 14. The flange 40 includes an elevated ledge 44 and a side 46 sloping down from the ledge 44 at a "flange" angle $\phi$ such as 15-degrees to the main body of the cover 16.

Figure 4A:
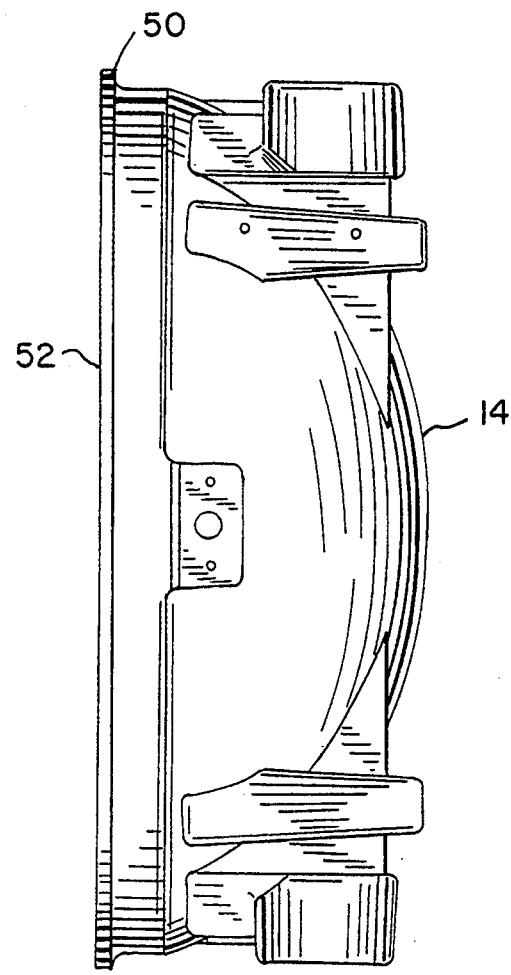
FIGS. 4A and 4B provide a side view of a base of an explosion-proof enclosure as shown in FIG. 1 and a cross-sectional view of an angled V-band flange for such a base.
Figure 4B:
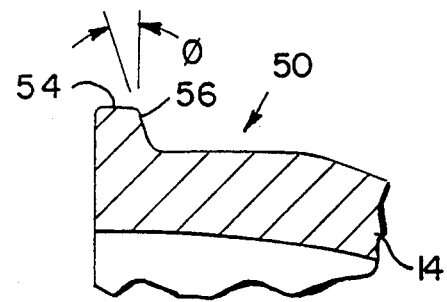

Referring now to FIGS. 4A and 4B, the base 14 is shown as including a circular ridge-like flange 50 which projects radially outward along its inner edge 52. The base 14 follows generally circular and elliptical contours and is manufactured from cast aluminum alloy having the flange 50 machined along its inner edge 52 for mating with the cover 16. The flange 50 includes an elevated ledge 54 and a side 56 sloping down from the ledge 54 at a "flange" angle $\phi$ such as 15-degrees to the body of the base 14. The flanges 40 and 50 are matched in size and shape so as to fit within and be clamped together by a suitable V-band coupling.

Figure 5:
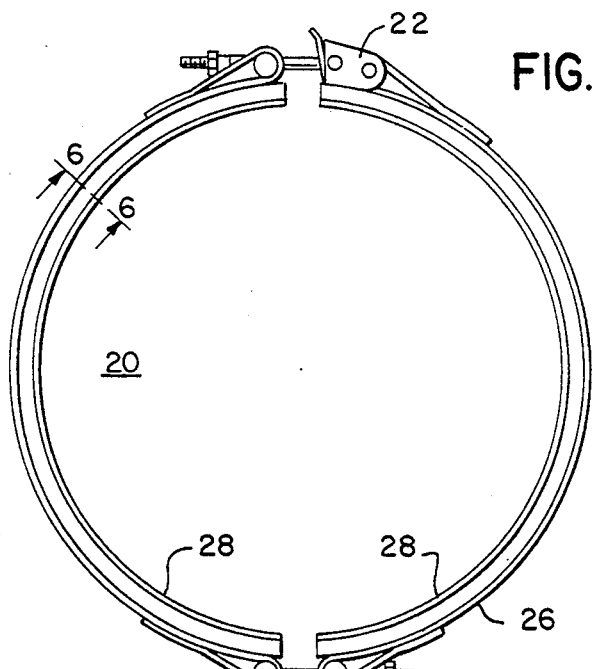
FIG. 5 provides a side view of a V-band coupling of the type which might be used in conjunction with the enclosure of FIG. 1.

Referring now to FIG. 5, a V-band coupling 20 is shown as including a retaining strap 26, a pair of V-band segments 28 and a pair of trunnion joints 22 and 24. The V-band may be comprised of type 304 stainless steel having a hardness of 220-270 on the Vickers scale before forming. The trunnion joints 22 and 24 connect the ends of the strap 26 and allow the V-band 20 to be tightened down upon the flanges 40 and 50 circling the two halves of an explosion-proof enclosure 10.

Figure 6:
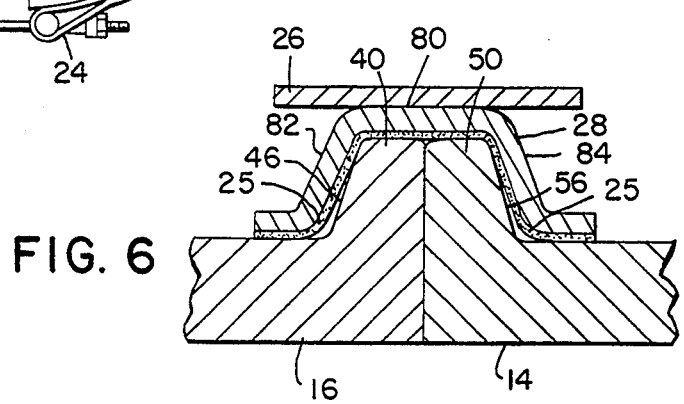
FIG. 6 provides a cross-sectional view of along lines 6—6 of the V-band coupling shown in FIG. 5 in conjunction with the flanges of FIGS. 3B and 4B.

Referring now to FIG. 6, the V-band 28 takes the shape of an inverted U having a base 80 and sidewalls 82 and 84 each of which extends down from the base 80 and outward at an angle of about 30-degrees. In operation, the V-band 28 attached to the strap 26 is fitted down upon the flanges 40 and 50 as the trunnion joints 22 and 24 are tightened. The V-band 28 includes a roughened layer 25 along its inner or clamping surfaces on the sidewalls 82 and 84 which contact and grip the sides 46 and 56 of the flanges 40 and 50. The toughened layer 25 enables these clamping surfaces to provide a high coefficient of friction which is generally greater than 0.30 and which substantially increases the ability of the V-band 28 to grip and hold onto the sides of the flanges 40 and 50 as the enclosure 10 may attempt to expand outward against the retaining action of the coupling 20 due to an explosion or pressure buildup. In effect, the roughened layer 25 on the V-band 28 helps to prevent the V-band coupling 20 from sliding off of the flanges 40 and 50 thereby substantially reducing the circumferential or "hoop" stresses induced on the coupling 20 as pressure within the enclosure 10 increases.

Figure 7:
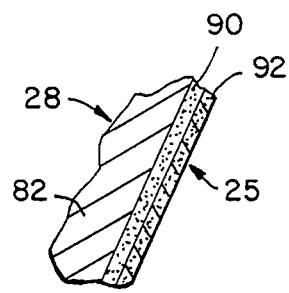
FIG. 7 provides an expanded cross-sectional view of the sidewall of a V-band in acordance with the present invention.

Referring now to FIG. 7, the roughened layer 25 on the sidewall 82 includes a textured surface 90 and a corrosion resistant coating 92. The toughened layer 25 is prepared by having the interior surfaces of the V-band 28 pneumatically grit-blasted with aluminum oxide of grit size number 12 to prepare the textured surface 90. This grit comprises a coarse angular grit selected to create an effective gripping surface on the V-band 28 which is optimized for engaging the angled flanges of the enclosure 10. After the interior surfaces of the V-band 28 are pnuematically "grit-blasted" these surfaces are thermally sprayed with "pure nickel" alloy (97%+ nickel) by a combustion gun fueled by a combination of oxygen and acetylene which is used to apply the coating 92. The nickel coating 92 which is sprayed onto the textured surface 90 helps to provide further corrosion resistance and has been discovered to help further increase the coefficient of friction provided by the toughened layer 25.

The gripping force applied to the angled sides 46 and 56 of the flanges 40 and 50 is proportional to the force which the flanges experience around their circumference due to internal pressure and is inversely proportional to the cosine of the flange angle plus the static coefficient of friction multiplied by the sine of the flange angle. More particularly, the trunnion load has been mathematically defined in accordance with equation (1) below:

$$\text{Load} = \frac{d^2 P_o (\text{Sin}\phi - \mu \text{Cos}\phi)}{4(\text{Cos}\phi - \mu \text{Sin}\phi)} \quad (1)$$

where:
$P_o$ = internal pressure in enclosure
$d^2$ = diameter of the V-band
$\phi$ = flange angle
$\mu$ = coefficient of friction between V-band and flanges Therefore, it has been determined that for large enclosures that if the coefficient of friction exceeds 0.15, the circumferential load can be held to less than 8,000 pounds even at an internal pressure of 360 psi which is approximately three times the explosion pressure recorded during explosion tests.

Figure 8:
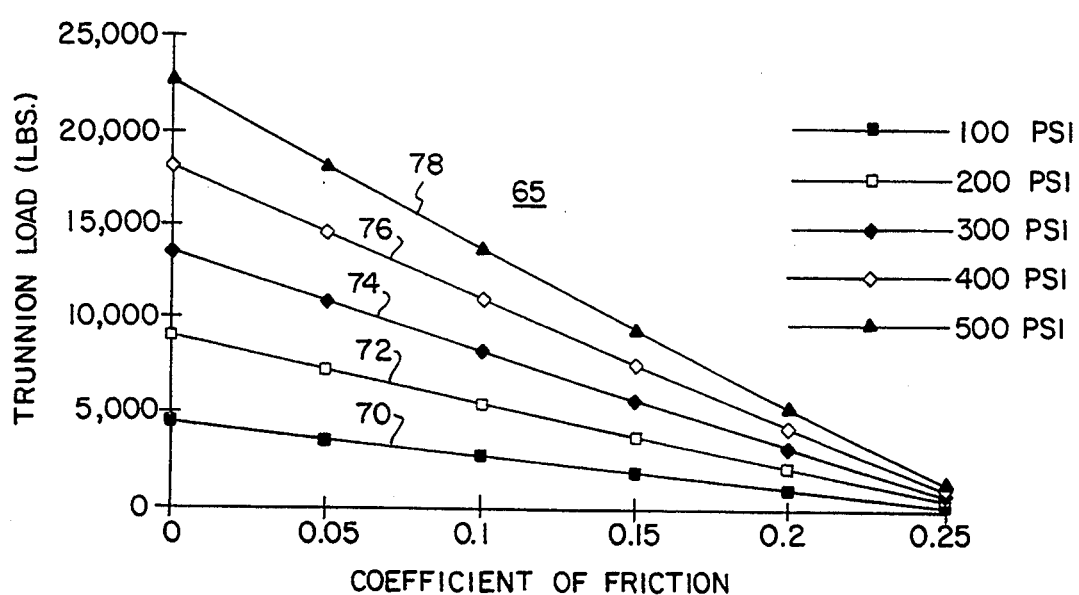
FIG. 8 provides a graph demonstrating the operation of the present invention in reducing trunnion loads and hoop stress.

Referring now to FIG. 8, a graph is provided illustrating the operation of the present invention with the trunnion load on the ordinate and the coefficient of friction between the V-band coupling and enclosure flanges on the abscissa. The lines 70, 72, 74, 76 and 78 represent different pressure levels within an explosion-proof enclosure and demonstrate how the hoop (i.e. tensile) stress on the trunnion joints is a direct function of the coefficient of friction and how the hoop stress can be dramatically decreased by increasing the coefficient of friction between the V-band coupling and the flanges of the enclosure. Since the principle mode of failure of explosion-proof enclosures may be trunnion breakage it can be readily observed that the performance of explosion-proof enclosures can be greatly improved by increasing the coefficient of friction between the V-band coupling and flanges of the enclosure in accordance with the principles of the present invention.

It should be noted that good adherence of the paint on the enclosure to the base material of the enclosure is necessary to increasing the friction between the V-band coupling and the enclosure flanges. If the paint does not have good adhesion to the flanges of the enclosure then the V-band coupling may not be able to penetrate the paint layer to grip the aluminum underneath before sliding off of the enclosure flanges and therefore a properly painted surface on the enclosure is important to the operation of the present invention.

While particular embodiments of the present invention have been shown and described, it should be clear that changes and modifications may be made to such embodiments without departing from the true scope and spirit of the invention. It is intended that the appended claims cover all such changes and modifications.

We claim:

1. An explosion-proof enclosure, comprising:
   a metal chamber having two halves which fit together at outwardly extending flanges and which define an interior cavity; and
   a V-band coupling constructed and arranged to grip said flanges and hold said halves together, said V-band coupling including:
   a retaining strap;
   at least one trunnion joint for circumferentially joining together respective ends of the retaining strap, the trunnion joint having a yield value of circumferential tensile load beyond which the trunnion joint is subject to failure;
   at least one V-band segment on the interior of the retaining strap for engaging said flanges and holding the two halves of the metal chamber together;
   means formed on the V-band segment for reducing transmission of force from a first force acting to separate the metal chamber halves to a second force acting to impart circumferential tensile load on the retaining strap and the trunnion joint;
   wherein (a) the means for reducing transmission of force comprises a roughened layer applied to surfaces of the V-band segment which grip the flanges on the metal chamber halves, (b) the roughened layer provides a coefficient of friction greater than approximately 0.30 between the V-band segment and the flanges, (c) contact surfaces on the flanges where the flanges contact the V-band segment are painted, (d) frictional forces between the V-band segment and the flanges are acting on said painted contact surfaces, (e) the adhesion of the paint onto the flanges is strong enough to prevent separating of the paint from the flanges for all said tolerable values of said first force, and (f) said means for reducing transmission of forces substantially increases the magnitude of said first force which can be tolerated while keeping the second force below said .yield value of circumferential tensile load for the trunnion joint.

2. The explosion-proof enclosure of claim 1, wherein said roughened layer comprises a textured surface generated by pneumatic blasting of said V-band segment surfaces with aluminum oxide grit.

3. The explosion-proof enclosure of claim 2, wherein said roughened layer further comprises a corrosion resistant coating applied to said textured surface.

4. The explosion-proof enclosure of claim 3, wherein said corrosion resistant coating comprises a nickel alloy.

5. The explosion-proof enclosure of claim 4, wherein said nickel alloy corrosion resistant coating is thermally sprayed on said textured surface.

* * * * *